United States Patent [19]
Erbes et al.

[11] Patent Number: 6,052,425
[45] Date of Patent: Apr. 18, 2000

[54] JET PUMP AUXILIARY WEDGE

[75] Inventors: John Geddes Erbes, Mt. View; Gerald Alan Deaver; Frank Ortega, both of San Jose, all of Calif.

[73] Assignee: General Electric Company, Schenectady, N.Y.

[21] Appl. No.: 09/217,979

[22] Filed: Dec. 21, 1998

[51] Int. Cl.$^7$ .............................. G21C 19/00; G21C 15/25
[52] U.S. Cl. .......................... 376/260; 376/372; 376/407; 376/392; 376/285
[58] Field of Search ..................................... 376/260, 285, 376/372, 392, 407

[56] References Cited

U.S. PATENT DOCUMENTS 4,675,149  6/1987  Perry et al. .............................. 376/372

*Primary Examiner*—Charles T. Jordan
*Assistant Examiner*—Jack Keith
*Attorney, Agent, or Firm*—Armstrong Teasdale LLP

[57] ABSTRACT

An auxiliary wedge apparatus configured to couple to the restrainer bracket of a jet pump assembly is described. In one embodiment, the auxiliary wedge apparatus includes a support block configured to couple to the restrainer bracket, and a wedge configured to slidingly couple to a wedge channel in the support block, and to engage the inlet mixer to restore a tight rigid fit-up of the jet pump components. The support block includes a wedge channel having tongues depending from the parallel sides of the channel and a hook shaped portion configured to receive the restrainer bracket. The support block also includes a lock screw to couple the support block to the restrainer bracket. The wedge includes grooves in the parallel sides of the wedge configured to slidingly engage the tongues extending in the wedge channel. The auxiliary wedge apparatus also includes a restraint arm depending from the support block configured to capture the existing set screw in the restrainer bracket to prevent the screw from completely unscrewing.

18 Claims, 3 Drawing Sheets

JET PUMP AUXILIARY WEDGE

BACKGROUND OF THE INVENTION

This invention relates generally to nuclear reactors and more particularly, to apparatus for repairing jet pump assemblies within a nuclear reactor pressure vessel.

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus located between the cylindrical reactor pressure vessel and the cylindrically shaped shroud.

In a BWR, hollow tubular jet pumps positioned within the shroud annulus, provide the required reactor core water flow. The upper portion of the jet pump, known as the inlet mixer, is laterally positioned and supported against two opposing rigid contacts within restrainer brackets by a gravity actuated wedge. The restrainer brackets support the inlet mixer by attaching to the adjacent jet pump riser pipe. The purpose of the gravity actuated wedge is to maintain contact between the inlet mixer and the restrainer bracket. The wedge works in cooperation with two set screws which are tack welded to the restrainer bracket to maintain contact with the inlet mixer. The flow of water through the jet pumps typically includes pressure fluctuations which are caused by various sources in the reactor system. The pressure fluctuations may have frequencies close to one or more natural vibration modes of the jet pump piping. The jet pump piping stability depends on the tight fit-up, or contact, of the restrainer brackets and the inlet mixers. Operating thermal gradients, hydraulic loads, and fluctuations in the hydraulic loads can overcome the lateral support provided by the gravity wedge, allowing gaps or clearances to develop at the opposing two fixed contacts or set screws. Particularly, the tack welds can break and the set screws can loosen permitting the jet pump to vibrate within the restrainer bracket. The loss of contact between the inlet mixer and the restrainer bracket can change the jet pump natural frequency to match some excitation frequency in the system, causing vibration of the piping and exerting increased loads which may cause cyclic fatigue cracking and wear of the piping supports, which can result in degradation from wear and fatigue at additional jet pump structural supports.

To overcome this problem, gravity wedge supports have been used at locations where clearances have developed in restrainer bracket contacts. The gravity wedge support employed a sliding wedge and a fixed bracket mount which engaged the jet pump restrainer bracket. To allow access for installation of the wedge support required disassembly of the jet pumps, which is an undesirable expense and may cause an extension of reactor maintenance downtime. Additionally, the gravity wedge supports typically included bolted attachments which could vibrate loose and fall into the reactor. Another attempted solution is to reinforce the welded attachment of the two set screws to the restrainer bracket, then reset the inlet mixer against the set screws when the jet pump is reassembled. However, this procedure causes significant downtime and also requires disassembling the jet pumps.

It would be desirable to provide an apparatus for restoring the tight rigid fit-up provided between the inlet mixer and the adjacent restrainer bracket, replacing the support function of the existing screw type contacts. It would also be desirable to provide an apparatus that would prevent the set screws from backing out completely and escaping into the reactor system. Additionally, it would be desirable to provide an apparatus that can be remotely installed by attachment to the existing restrainer bracket without disassembling the inlet mixer, and remain in place during disassembly of the jet pumps during maintenance shutdowns.

BRIEF SUMMARY OF THE INVENTION

These and other objects may be attained by an auxiliary wedge apparatus configured to couple to the restrainer bracket at a position adjacent an existing screw type contact, typically a setscrew. In one embodiment, the auxiliary wedge apparatus includes a support bracket configured to couple to the restrainer bracket, and a wedge configured to slidingly couple to a wedge channel in the support block. The wedge is also configured to engage the inlet mixer to restore a tight rigid fit-up of the jet pump components.

Particularly, the support block includes a first portion and a second portion. The first portion includes a wedge channel tapering from the top of the first portion. A hook shaped section is located at a bottom end of the first portion. The hooked shaped section is configured to receive the restrainer bracket.

The second portion of the support block extends from the top end of the first portion away from the wedge channel. A screw opening extends through the second portion of the support block. A lock screw is configured to threadingly engage and extend through the screw opening. The head of the lock screw includes a plurality of ratchet teeth located around the periphery of the head. A double cantilever spring is coupled to the top of the support block and is configured to engage the ratchet teeth of the lock screw. The engagement of the spring with the ratchet teeth prevents the lock screw from loosening. The second portion also includes a release opening located adjacent the double cantilever spring and configured to receive a release tool to enable the lock screw to be loosened.

The support block also includes a restraint arm depending from the second portion. The restraint arm is configured to capture the existing setscrew located in the restrainer bracket. The restraint arm prevents the set screw from completely unscrewing and falling into the reactor.

The wedge channel extends longitudinally in the first portion of the support block, and is tapered from the top to the bottom of the support block. Each opposing parallel side of the wedge channel includes a tongue extending longitudinally and configured to be parallel to the tapered bottom of the wedge channel.

The wedge includes a groove located in each of the opposing parallel sides of the wedge. The grooves are configured to slidingly engage the respective tongues located in the opposing sides of the wedge channel. The wedge also includes a stop screw to prevent the wedge from passing completely through the wedge channel. Particularly, the stop screw is configured to threadingly engage a screw opening in the tapered side at the top of the wedge. Additionally, the wedge includes an integral installation handling opening extending through the top of the wedge.

To restore the tight rigid fit-up between the inlet mixer and the adjacent restrainer bracket without disassembly of the jet pumps, the auxiliary wedge apparatus is coupled to the restrainer bracket. First, the auxiliary wedge apparatus is preassembled. Particularly, the wedge is inserted into the wedge channel of the support block with the tongues on the sides of the wedge channel engaging the grooves of the wedge. The thick end of the wedge is inserted into the bottom of the wedge channel and the wedge is then slid up the channel. The grooves in the wedge are configured so that the wedge cannot slide completely up through the channel. Next, the stop screw is threaded into the screw opening at the top of the wedge and locked by a pin captured in a drilled hole. The stop screw prevents the wedge from disengaging by sliding all the way back down the wedge channel.

The auxiliary wedge apparatus is then lowered onto the restrainer bracket by the handling opening in the top of the wedge. The apparatus is configured to fit between the inlet mixer and the restrainer bracket without disassembly of the inlet mixer. As the wedge apparatus is lowered into contact with the mixer, the hooked shaped portion of the support block is forced into engagement with the restrainer bracket. The lock screw is then screwed into the lock screw opening in the support block. The action of the lock screw and the hook shaped portion of the support block couple the apparatus to the restrainer bracket. The ratchet teeth on the head of the lock screw engage the double cantilever spring which prevents the lock screw from loosening.

The wedge is then released from the handling pole and gravity causes the wedge to slide down the wedge channel into tight contact with the inlet mixer. The wedging action of the wedge between the inlet mixer and the support block which is coupled to the restrainer bracket provides a tight fit-up of the inlet mixer.

To release the auxiliary wedge apparatus in the unlikely event that removal is required, a release tool is inserted into the lock screw release opening. The release tool is configured to engage and deflect the double cantilever spring, which releases the engagement between the spring and the ratchet teeth of the lock screw. The lock screw is then loosened until it clears the bracket, permitting the apparatus to be decoupled from the restrainer bracket and removed from the reactor.

The above described auxiliary wedge apparatus restores the tight rigid fit-up between the inlet mixer and the adjacent restrainer bracket, replacing the support function of the existing screw type contacts. Also the apparatus includes a restraint arm to prevent the existing set screws from backing out completely and escaping into the reactor system. Additionally, the apparatus may be remotely installed by attachment to the existing restrainer bracket, and is configured to remain in place during disassembly of the jet pumps during maintenance shutdowns. Further the auxiliary wedge apparatus, when assembled, does not contain parts that are susceptible to loosening during reactor operation and falling into the reactor.

DETAILED DESCRIPTION OF THE INVENTION

Figure 1:
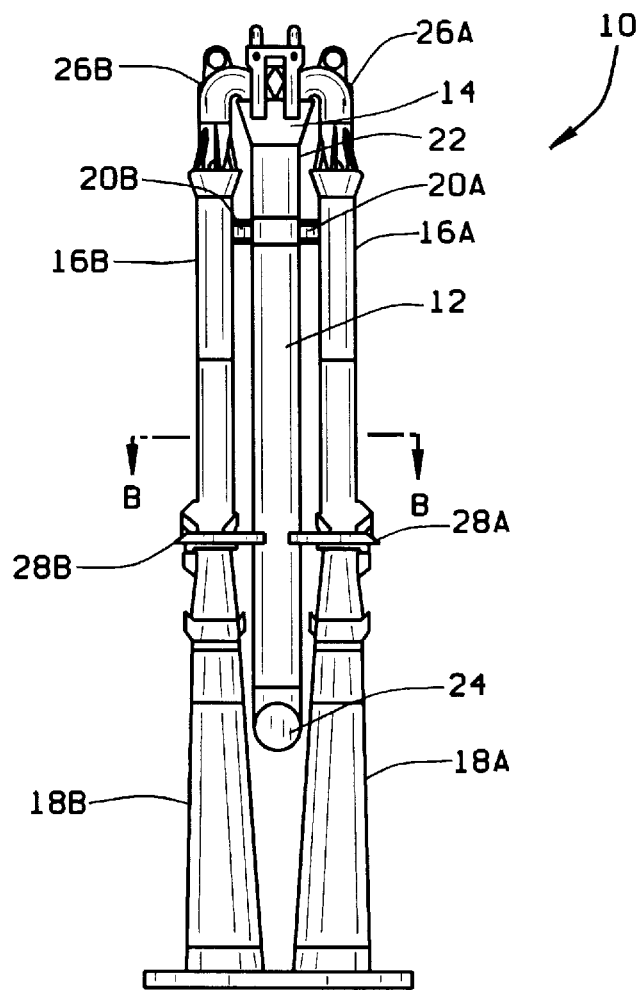
FIG. 1 is a side view of a boiling water nuclear reactor jet pump assembly.

FIG. 1 is a side view of a boiling water nuclear reactor jet pump assembly 10. Water flows through jet pump assembly 10 and into the reactor core (not shown). Jet pump assembly 10 includes a riser assembly 12, a transition assembly 14, two inlet mixer assemblies 16A and 16B, and two diffuser assemblies 18A and 18B. Particularly, riser assembly 12 is supported by riser braces 20A and 20B which couple riser 12 to the reactor vessel (not shown). Transition assembly 14 is coupled to the upper end 22 of riser 12 to split the flow of water into two paths, one through inlet mixer 16A and the other through inlet mixer 16B. Water enters riser assembly 12 through jet pump inlet nozzle 24. Inlet mixers 16A and 16B are coupled at one end to transition piece 14 by elbows 26A and 26B respectively, and at an opposite end to jet pump diffuser assemblies 18A and 18B respectively. For support and to prevent pipe vibrations, restrainer brackets 28A and 28B couple inlet mixer assemblies 16A and 16B to riser pipe 12.

Figure 2:
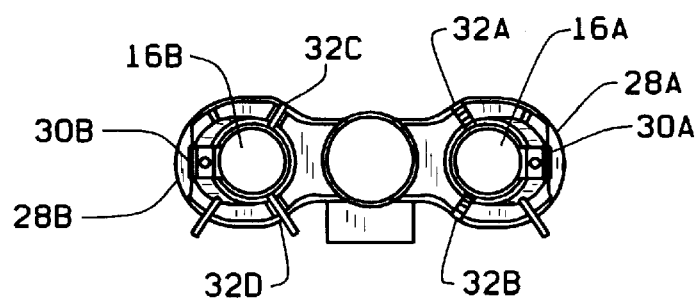
FIG. 2 is a cross sectional view through line B—B of the jet pump assembly shown in FIG. 1.

Referring to FIG. 2, wedges 30A and 30B are positioned between restrainer brackets 28A and 28B and inlet mixers 16A and 16B respectively. Screw contacts 32A, 32B, 32C, and 32D extend through restrainer brackets 28A and 28B and contact mixers 16A and 16B respectively to provide a tight rigid fitup. Screw contacts 32A and 32B are each located 120° away from wedge 30A in restrainer bracket 28A, and screw contacts 32C and 32D are each located 120° away from wedge 30B in restrainer bracket 28B. Typically set screws 32A, 32B, 32C, and 32D are tack welded to restrainer brackets 28A and 28B to prevent set screws 32A, 32B, 32C, and 32D from loosening. However, because of the severe conditions present in the reactor vessel, the tack welds may fail permitting set screws 32A, 32B, 32C, and 32D to loosen which will destroy the tight rigid fit-up of inlet mixers 16A and 16B in restrainer brackets 28A and 28B. Without a rigid fit-up, inlet mixers 16A and 16B may vibrate which is an undesirable condition.

Figure 3:
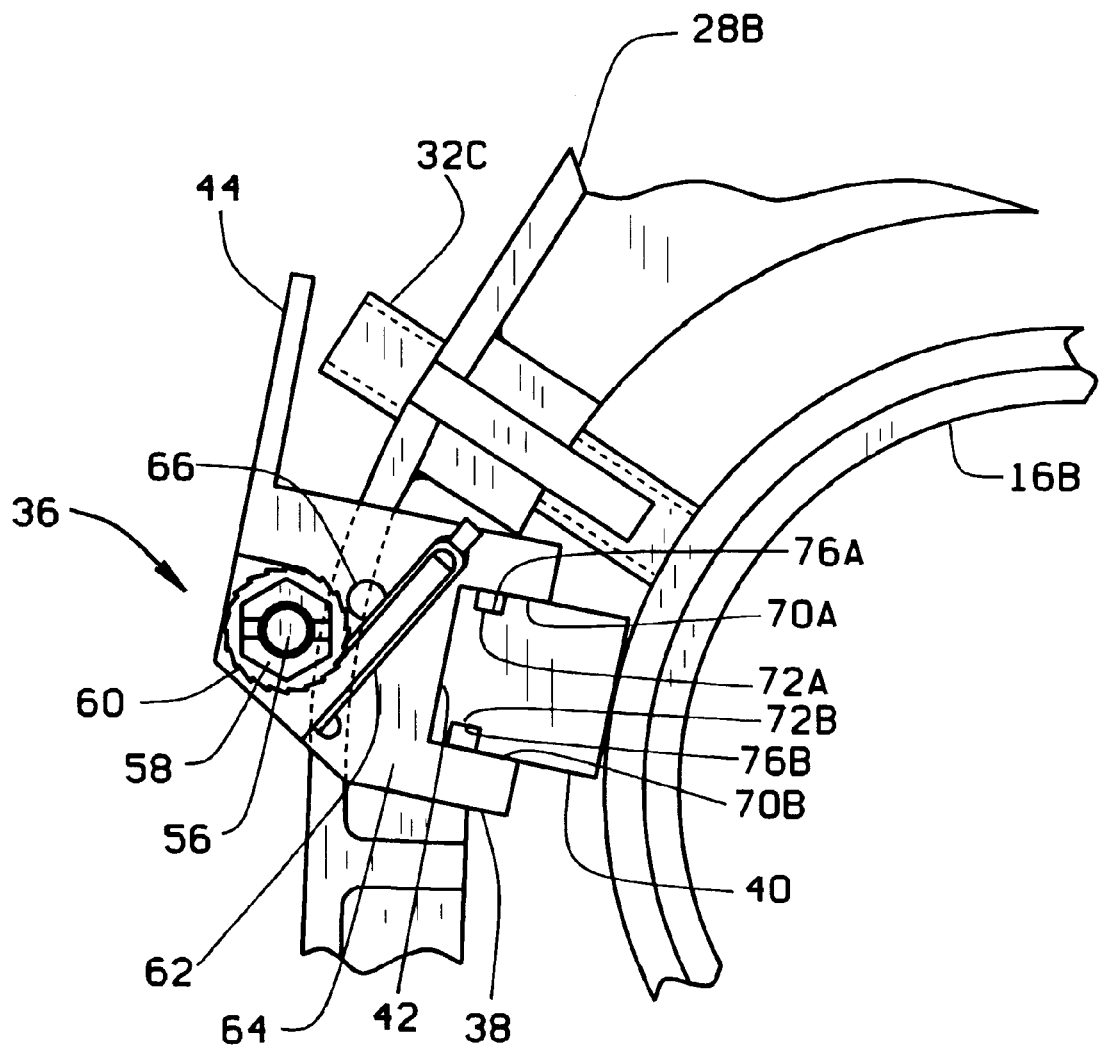
FIG. 3 is a top sectional view of an auxiliary wedge apparatus in accordance with one embodiment of the present invention.
Figure 4:
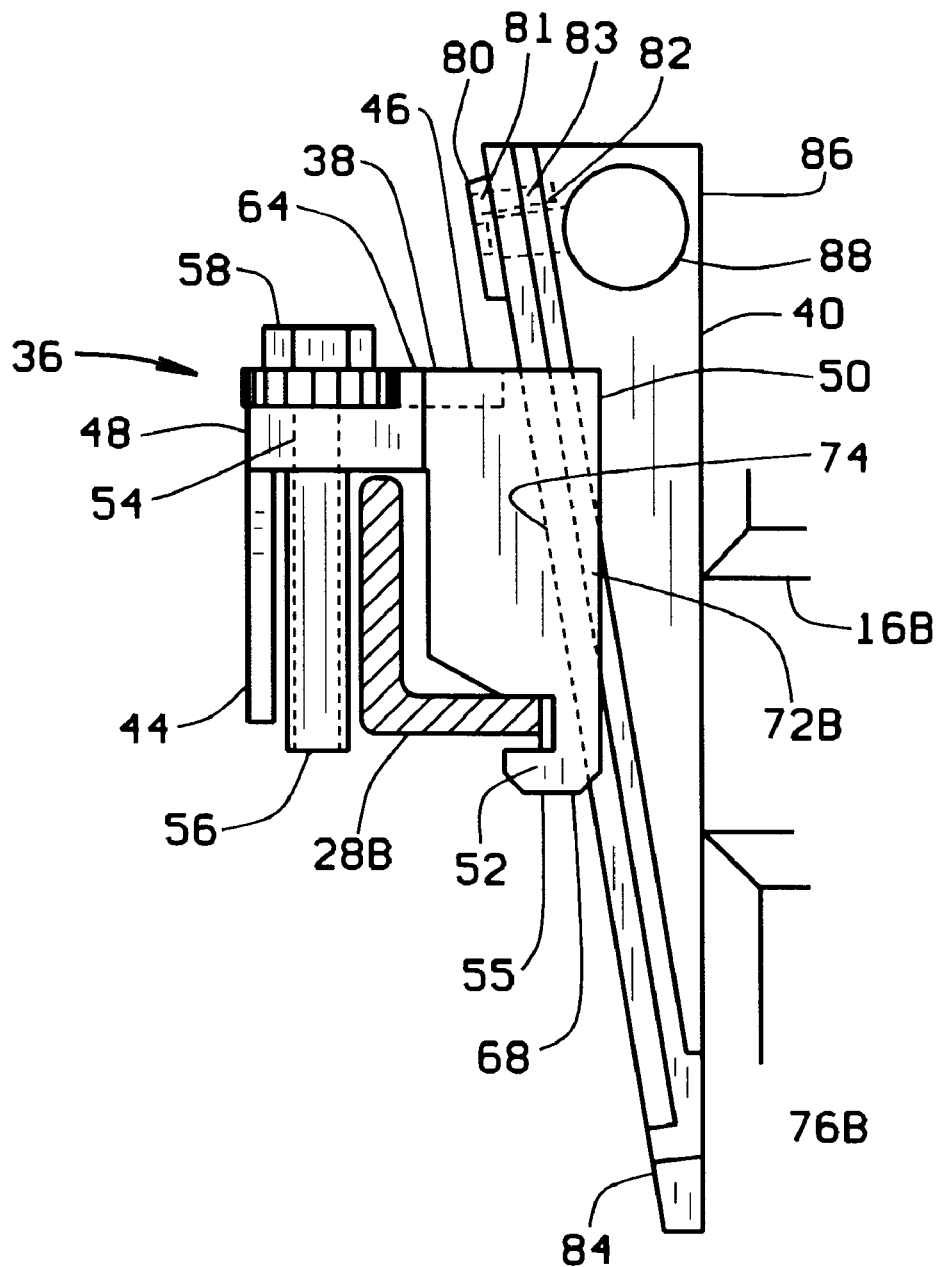
FIG. 4 is a side view of the auxiliary wedge apparatus shown in FIG. 3.

FIG. 3 is a top view of an auxiliary wedge apparatus 36, coupled to inlet mixer 16B, and FIG. 4 is a side view of auxiliary wedge apparatus 36. Referring to FIGS. 3 and 4, auxiliary wedge apparatus 36 is configured to couple to restrainer bracket 28B at a position adjacent to set screw 32C. In other embodiments, auxiliary wedge apparatus 36 may be configured to couple to restrainer bracket 28A or 28B at a position adjacent to one of set screws 32A, 32B, 32C or 32D. Auxiliary wedge apparatus 36 includes a support block 38 configured to couple to restrainer bracket 28B, and a wedge 40 configured to slidably couple to a wedge channel 42 located in support block 38. Wedge 40 is also configured to engage inlet mixer 16B to restore a tight rigid fit-up of inlet mixer 16B with restrainer bracket 28B in the event that set screw 32C loosens. Auxiliary wedge apparatus 36 also includes a restrainer arm 44 configured to engage loose set screw 32C and prevent set screw 32C from backing out from restrainer bracket 28B and falling into the reactor.

Particularly, support block 38 includes a first portion 46 and a second portion 48. First portion 46 includes wedge channel 42 tapering from the top 50 of first portion 46. A hook shaped section 52 is located at a bottom end 55 of first portion 46. Hooked shaped section 52 is configured to receive restrainer bracket 28B.

Second portion 48 extends from top end 50 of first portion 46 away from wedge channel 42. A screw opening 54 extends through second portion 48 of support block 38. A lock screw 56 is configured to threadingly engage and extend through screw opening 54. The head 58 of lock screw 56 includes a plurality of ratchet teeth 60 located around the periphery of head 58. A double cantilever spring 62 is coupled to the top 64 of support block 38 and is configured to engage ratchet teeth 60 of lock screw 58. The engagement of spring 62 with ratchet teeth 60 prevents lock screw 56 from loosening. Second portion 48 also includes a release opening 66 located adjacent double cantilever spring 62 and configured to receive a release tool (not shown) to enable lock screw 56 to be loosened.

Support block 38 also includes restraint arm 44 depending from second portion 48. Restraint arm 44 is configured to capture existing set screw 32C located in restrainer bracket 16B. Restraint arm 44 prevents set screw 23C from completely unscrewing and falling into the reactor.

Wedge channel 42 extends longitudinally in first portion 46 of support block 38, and is tapered from top 64 to bottom 68 of support block 38. Opposing parallel sides 70A and 70B of wedge channel 42 includes tongues 72A and 72B respectively. Tongues 72A and 72B extend longitudinally and are configured to be parallel to a tapered bottom 74 of wedge channel 42.

Wedge 40 includes grooves 76A and 76B located in opposing parallel sides 78A and 78B respectively. Grooves 76A and 76B are configured to slidingly engage tongues 72A and 72B respectively. Wedge 40 also includes a stop screw 80 to prevent wedge 40 from disengaging wedge channel 42 by passing completely through wedge channel 42. Particularly, stop screw 80 is configured to threadingly engage a screw opening 82 in a tapered side 84 of wedge 40 located at top 86 of wedge 40. Stop screw 80 is locked in place by a pin 81 captured in a locking pin hole 83. Additionally, a handling opening 88 extends through top 86 of wedge 40.

Auxiliary wedge apparatus 36 may be fabricated from any suitable material, For example, austenitic stainless steel with a nitride hardened surface, or age hardened nickel-chrome-iron alloy X-750 may be used. Preferably, double cantilever spring 62 is fabricated from age hardened nickel-chrome-iron alloy X-750.

To restore the tight rigid fit-up between inlet mixer 16B and adjacent restrainer bracket 28B without disassembly of jet pump assembly 10, auxiliary wedge apparatus 36 is coupled to restrainer bracket 28B. Particularly, wedge 40 is inserted into wedge channel 42 of support block 38 with the tongues 72A and 72B of wedge channel 42 engaging grooves 76A and 76B of wedge 40 respectively. Top end 84, which is the thick end, of wedge 40 is inserted into the bottom of wedge channel 42 and wedge 40 is then slid up channel 42. Grooves 76A and 76B in wedge 40 are configured so that wedge 40 cannot slide completely up through channel 42. Next, stop screw 80 is threaded into screw opening 82 at top 84 of wedge 40 and locked by pin 81 captured in locking pin hole 83. Stop screw 80 prevents wedge 40 from disengaging by sliding all the way back down wedge channel 42.

Auxiliary wedge apparatus 36 is then lowered onto restrainer bracket 28B with the use of handling opening 88 in top 84 of wedge 40. Apparatus 36 is configured to fit between inlet mixer 16B and restrainer bracket 28B. As wedge apparatus 36 is lowered into contact with mixer 16B, hooked shaped section 52 of support block 38 is forced into engagement with restrainer bracket 28B. Lock screw 56 is then screwed into the lock screw opening 54 in support block 38. The action of lock screw 56 and hook shaped section 52 of support block 38 couple apparatus 36 to restrainer bracket 28B. Ratchet teeth 60 located on head 58 of lock screw 56 engages double cantilever spring 62 which prevents lock screw 56 from loosening.

Wedge 40 is then released from the handling pole (not shown) and gravity causes wedge 40 to slide down wedge channel 42 into contact with inlet mixer 16B. The wedging action of wedge 40 between inlet mixer 16B and support block 38 which is coupled to restrainer bracket 28B provides a tight fit-up of inlet mixer 16B.

To release auxiliary wedge apparatus 36 from restrainer bracket 28B, a release tool (not shown) is inserted into release opening 66. The release tool is configured to engage double cantilever spring 62 which releases the engagement between spring 62 and ratchet teeth 60 of lock screw 56. Lock screw 56 is then loosened and removed, permitting apparatus 36 to be decoupled from restrainer bracket 28B and removed from the reactor.

The above described auxiliary wedge apparatus 36 restores the tight rigid fit-up between inlet mixers 16A and 16B and adjacent restrainer bracket 28A and 28B, replacing the support function of existing screw type contacts 32A, 32B, 32C, and 32D. Also apparatus 36 includes restraint arm 44 to prevent existing set screws 32A, 32B, 32C, and 32D from backing out completely and escaping into the reactor system. Additionally apparatus 36 may be remotely installed by attachment to existing restrainer bracket 28A and 28B, and is configured to stay in place during disassembly of the jet pump assembly 10 during maintenance shutdowns. Further auxiliary wedge apparatus 36, when assembled, does not contain parts that are susceptible to loosening during reactor operation and falling into the reactor.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

We claim:

1. An auxiliary wedge apparatus for restoring the tight rigid fit between an inlet mixer of a jet pump and an adjacent restrainer bracket coupled to a jet pump riser in a boiling water nuclear reactor pressure vessel, the pressure vessel including a jet pump and a jet pump riser, said apparatus comprising:

a support block configured to engage the restrainer bracket adjacent the inlet mixer and comprising a shallow angled wedge channel; and a wedge configured to slidably engage said wedge channel of said support block, said wedge tapering from a first end to a second end, said wedge comprising a stop screw coupled to a tapered side of said wedge.

2. An apparatus in accordance with claim 1 wherein said wedge channel comprises a first side, a second side and a bottom tapered from a first end of said support block.

3. An apparatus in accordance with claim 2 wherein said wedge channel further comprises a first tongue depending from said first side and a second tongue depending from said second side, said first and second tongues extending longitudinally and configured to be parallel to said bottom of said wedge channel.

4. An apparatus in accordance with claim 3 wherein said wedge comprises a first groove located in a first side of said wedge and a second groove located in a second side of said wedge, said first and second sides configured to be substantially parallel, said first and said second grooves configured to slidingly engage said first and said second tongues respectively.

5. An apparatus in accordance with claim 4 wherein said stop screw coupled to said tapered side of said wedge is located at said first end of said wedge.

6. An apparatus in accordance with claim 1 wherein said support block comprises a first portion and a second portion, said first portion including a first end and a second end and comprising said wedge channel tapering from said first end, and a hook shaped section located at said second end and configured to receive the restrainer bracket, said second portion of said support block extending from said first end of said first portion away from said wedge channel.

7. An apparatus in accordance with claim 6 wherein said second portion further comprises a screw opening extending therethrough, and a lock screw configured to threadingly engage and extend through said screw opening.

8. An apparatus in accordance with claim 7 wherein said lock screw comprises a screw head and a plurality of ratchet teeth around the periphery of said screw head.

9. An apparatus in accordance with claim 8 wherein said support block further comprises a double cantilever spring coupled to said first end of said support block and configured to engage said ratchet teeth of said lock screw head.

10. An apparatus in accordance with claim 6 wherein said support block further comprises a restraint arm depending from said second portion and configured to engage a setscrew located in the restrainer bracket.

11. A method of restoring a tight rigid fit between an inlet mixer and an adjacent restrainer bracket in a boiling water nuclear reactor pressure vessel, the restrainer bracket coupled to a jet pump riser pipe, said method comprising the steps of:

coupling an auxiliary wedge apparatus to the restrainer bracket adjacent the inlet mixer, the auxiliary wedge apparatus comprising a support block and a wedge, the support block comprising a wedge channel, and the wedge configured to slidably engage the wedge channel and to engage the inlet mixers, said wedge comprising a stop screw coupled to a tapered side of the wedge; and sliding the wedge in the wedge channel so as to engage the inlet mixer, said stop screw preventing the wedge from sliding completely through the wedge channel.

12. A method in accordance with claim 11 wherein the wedge channel comprises a first side, a second side, a bottom tapered from a first end of the support block, a first tongue depending from the first side and a second tongue depending from the second side, the first and second tongues extending longitudinally and configured to be parallel to the bottom of the wedge channel.

13. A method in accordance with claim 12 wherein the wede comprises a first groove located in a first side of the wedge, a second groove located in a second side of the wedge, and a stop screw coupled to the tapered side of the wedge and located at the first end of the wedge, the first and second sides of the wedge configured to be substantially parallel, the first and the second grooves configured to slidingly engage the first and said second tongues respectively.

14. A method in accordance with claim 13 wherein the support block comprises a first portion and a second portion, the first portion including a first end and a second end and comprising the wedge channel tapering from the first end, and a hook shaped section located at the second end and configured to receive the restrainer bracket, the second portion of the support block extending from the first end of the first portion away from the wedge channel and comprising a screw opening extending therethrough, and a lock screw configured to threadingly engage and extend through the screw opening.

15. A method in accordance with claim 14 wherein the lock screw comprises a screw head and a plurality of ratchet teeth around the periphery of the screw head, and the support block further comprises a double cantilever spring coupled to the first end of the support block and configured to engage the ratchet teeth of the lock screw head.

16. A method in accordance with claim 15 wherein the support block further comprises a restraint arm depending from the second portion and configured to engage a setscrew located in the restrainer bracket.

17. A method in accordance with claim 16 wherein coupling an auxiliary wedge apparatus to the restrainer bracket adjacent the inlet mixer comprises the steps of:

inserting the wedge into the wedge channel of the support block so that the tongues located on the sides of the wedge channel engage the grooves located in the wedge;

threading the stop screw into the screw opening at the top of the wedge;

lowering the auxiliary wedge apparatus onto the restrainer bracket so that the support block engages the restrainer bracket;

screwing the lock screw into the lock screw opening in the support block so that the double cantilever spring engages the ratchet teeth located on the head of the lock screw.

18. A method in accordance with claim 17 wherein lowering the auxiliary wedge apparatus onto the restrainer bracket so that the support block engages the restrainer bracket comprises the step of lowering the auxiliary wedge apparatus onto the restrainer bracket so that the restrainer bracket is received in the hooked shaped portion of the support block.

* * * * *